United States Patent
Sawada et al.

(10) Patent No.: US 11,721,482 B2
(45) Date of Patent: Aug. 8, 2023

(54) METHOD OF PRODUCING CERAMIC ELECTRONIC COMPONENT AND CERAMIC ELECTRONIC COMPONENT

(71) Applicant: Murata Manufacturing Co., Ltd., Nagaokakyo (JP)

(72) Inventors: Takashi Sawada, Nagaokakyo (JP); Kenichi Togo, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 306 days.

(21) Appl. No.: 16/944,191

(22) Filed: Jul. 31, 2020

(65) Prior Publication Data

US 2021/0090801 A1 Mar. 25, 2021

(30) Foreign Application Priority Data

Sep. 25, 2019 (JP) ................................ 2019-174476

(51) Int. Cl.
*H01G 4/12* (2006.01)
*H01G 4/224* (2006.01)
*H01G 4/008* (2006.01)

(52) U.S. Cl.
CPC ........... *H01G 4/1209* (2013.01); *H01G 4/008* (2013.01); *H01G 4/224* (2013.01)

(58) Field of Classification Search
CPC ...... H01G 4/008; H01G 4/1209; H01G 4/224; H01G 4/232; H01G 4/2325; H01G 4/30
See application file for complete search history.

(56) References Cited

U.S. PATENT DOCUMENTS

| 2014/0182907 | A1* | 7/2014 | Lee | H01G 4/232 |
| | | | | 174/258 |
| 2018/0090276 | A1* | 3/2018 | Ito | H01G 4/248 |
| 2018/0182552 | A1* | 6/2018 | Sawada | H01G 4/30 |
| 2021/0057155 | A1* | 2/2021 | Zenzai | H01G 4/008 |
| 2022/0093333 | A1* | 3/2022 | Kisumi | H01G 4/2325 |

FOREIGN PATENT DOCUMENTS

JP 2015-26861 A 2/2015

* cited by examiner

*Primary Examiner* — Nathan Milakovich
(74) *Attorney, Agent, or Firm* — Keating & Bennett, LLP

(57) ABSTRACT

A method of producing a ceramic electronic component includes baking a first electrode paste containing a metal powder at a first temperature to form a first electrode layer at a first region of a ceramic body, baking a second electrode paste containing a metal powder of the same type as the metal powder in the first electrode paste at a second temperature lower than the first temperature to form a second electrode layer at a second region different from the first region of the ceramic body, and applying a physical shock treatment to a surface of the second electrode layer to densify a surface layer portion of the second electrode layer.

20 Claims, 4 Drawing Sheets

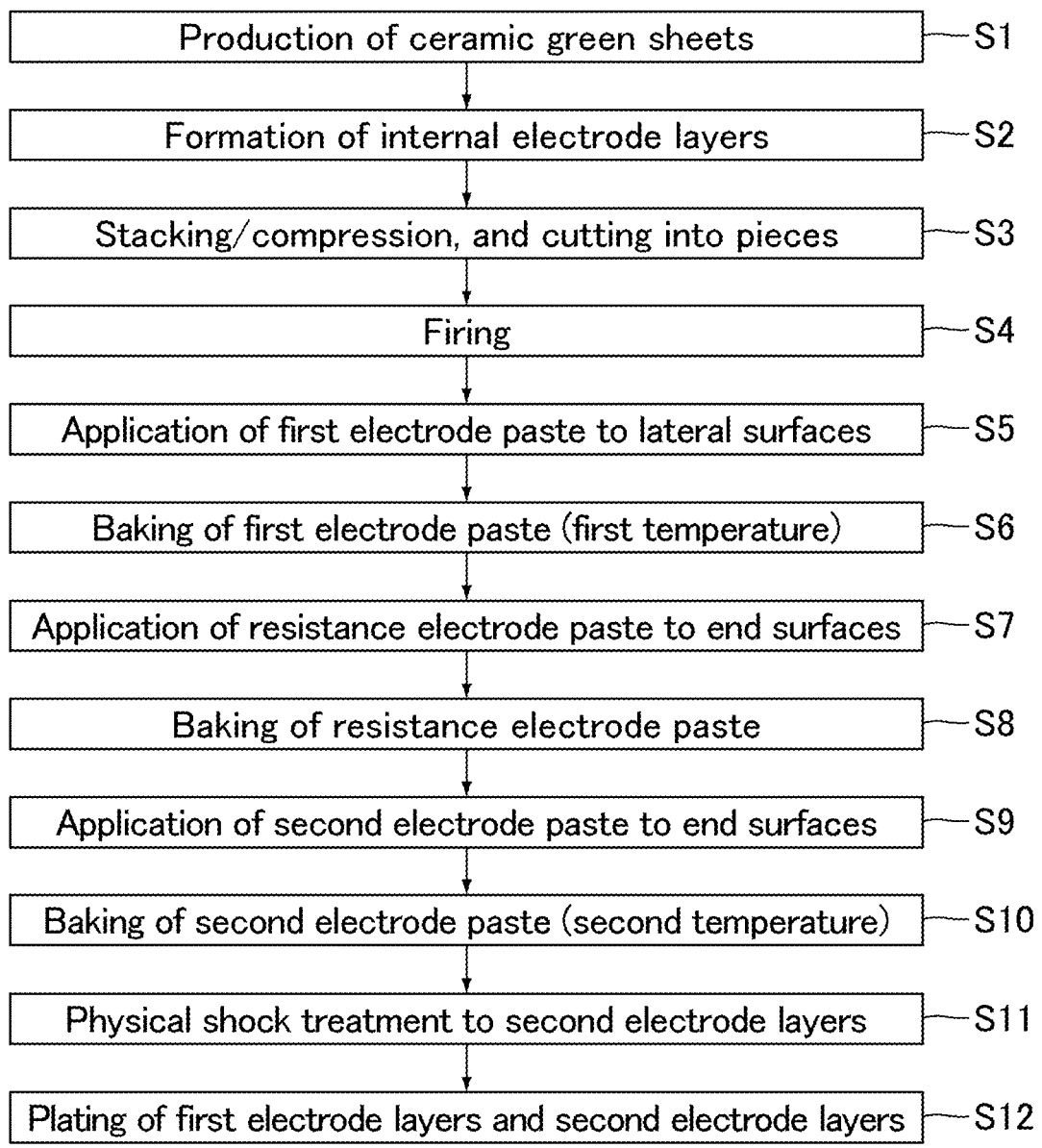

METHOD OF PRODUCING CERAMIC ELECTRONIC COMPONENT AND CERAMIC ELECTRONIC COMPONENT

CROSS REFERENCE TO RELATED APPLICATIONS

This application claims the benefit of priority to Japanese Patent Application No. 2019-174476 filed on Sep. 25, 2019. The entire contents of this application are hereby incorporated herein by reference.

BACKGROUND OF THE INVENTION

1. Field of the Invention

The present invention relates to a method of producing a ceramic electronic component and a ceramic electronic component.

2. Description of the Related Art

JP 2015-26861 A discloses a multilayer ceramic capacitor that includes a first external electrode and a second external electrode at opposing end surfaces and a third external electrode and a fourth external electrode at opposing lateral surfaces.

Each external electrode includes a first layer and a second layer, and the first layer and the second layer are both formed by baking a conductive paste.

In JP 2015-26861 A, the external electrodes are formed by the following process. (1) A conductive paste is applied and baked at 950° C. to form the first layers of the third external electrode and the fourth external electrode. (2) A conductive paste is applied and baked at 900° C. to form the second layers of the third external electrode and the fourth external electrode. (3) A conductive paste is applied and baked at 950° C. to form the first layers of the first external electrode and the second external electrode. (4) A conductive paste is applied and baked at 900° C. to form the second layers of the first external electrode and the second external electrode.

During the formation of the external electrodes by the above process, the baking temperature for the second layers is lower than the baking temperature for the first layers in order to reduce the damage (such as mutual diffusion of materials) to the first layers.

However, the third external electrode and the fourth external electrode formed first are sometimes damaged by the high baking temperature for the first layers of the first external electrode and the second external electrode.

Studies by the inventors of preferred embodiments of the present invention revealed that baking at lower temperatures in steps (3) and (4) can prevent damage to the third external electrode and the fourth external electrode formed first.

However, in this case, the first external electrode and the second external electrode formed later sometimes have insufficient density, resulting in low moisture resistance or infiltration of a plating solution.

SUMMARY OF THE INVENTION

Preferred embodiments of the present invention provide methods of producing a ceramic electronic component that are each capable of forming external electrodes having sufficient density in multiple regions without severely damaging the external electrodes formed first.

A method of producing a ceramic electronic component according to a preferred embodiment of the present invention includes baking a first electrode paste containing a metal powder at a first temperature to form a first electrode layer at a first region of a ceramic body; baking a second electrode paste containing a metal powder of the same type as the metal powder in the first electrode paste at a second temperature lower than the first temperature to form a second electrode layer at a second region different from the first region of the ceramic body; and applying a physical shock treatment to a surface of the second electrode layer to densify a surface layer portion of the second electrode layer.

A ceramic electronic component according to a preferred embodiment of the present invention includes a ceramic body, a first electrode layer provided in a first region of the ceramic body, and a second electrode layer provided in a second region different from the first region of the ceramic body. The first electrode layer and the second electrode layer contain metals of the same type, the metals of the same type in the first electrode layer and the second electrode layer have different densities, and the density of the metal in a surface layer portion of the second electrode layer is higher than the density of the metal in an inner portion of the second electrode layer.

Preferred embodiments of the present invention provide methods of producing a ceramic electronic component that are each capable of forming external electrodes having sufficient density in multiple regions without severely damaging the external electrodes formed first.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a flowchart of an example of a production process of a ceramic electronic component according to a preferred embodiment of the present invention.

DETAILED DESCRIPTION OF THE PREFERRED EMBODIMENTS

Methods of producing a ceramic electronic component and ceramic electronic components according to preferred embodiments of the present invention are described below with reference to the drawings.

The present invention is not limited to the following preferred embodiments, and may be suitably modified without departing from the gist of the present invention. Combinations of two or more features described in the following preferred embodiments are also within the scope of the present invention.

First Preferred Embodiment of Ceramic Electronic Component

First, a ceramic electronic component according to a first preferred embodiment of the present invention, which is produced by a method of producing a ceramic electronic component according to a preferred embodiment of the present invention, is described taking a case where the ceramic electronic component is a multilayer ceramic capacitor as an example.

The ceramic electronic component according to the first preferred embodiment is described.

Figure 1:
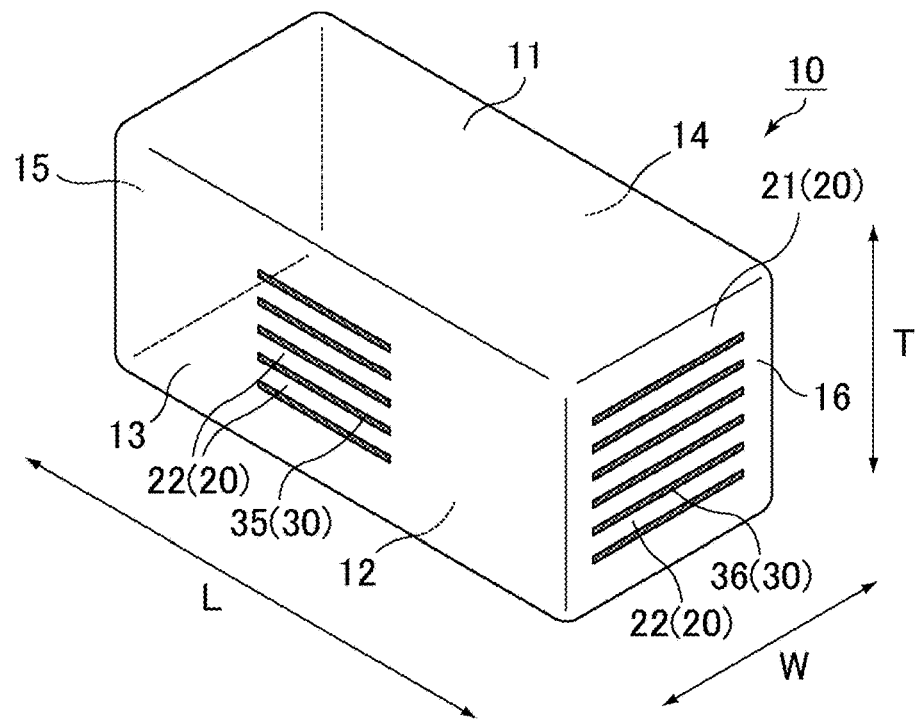
FIG. 1 is a schematic perspective view showing an example of a ceramic body defining a multilayer ceramic capacitor according to a first preferred embodiment of the present invention.
Figure 2:
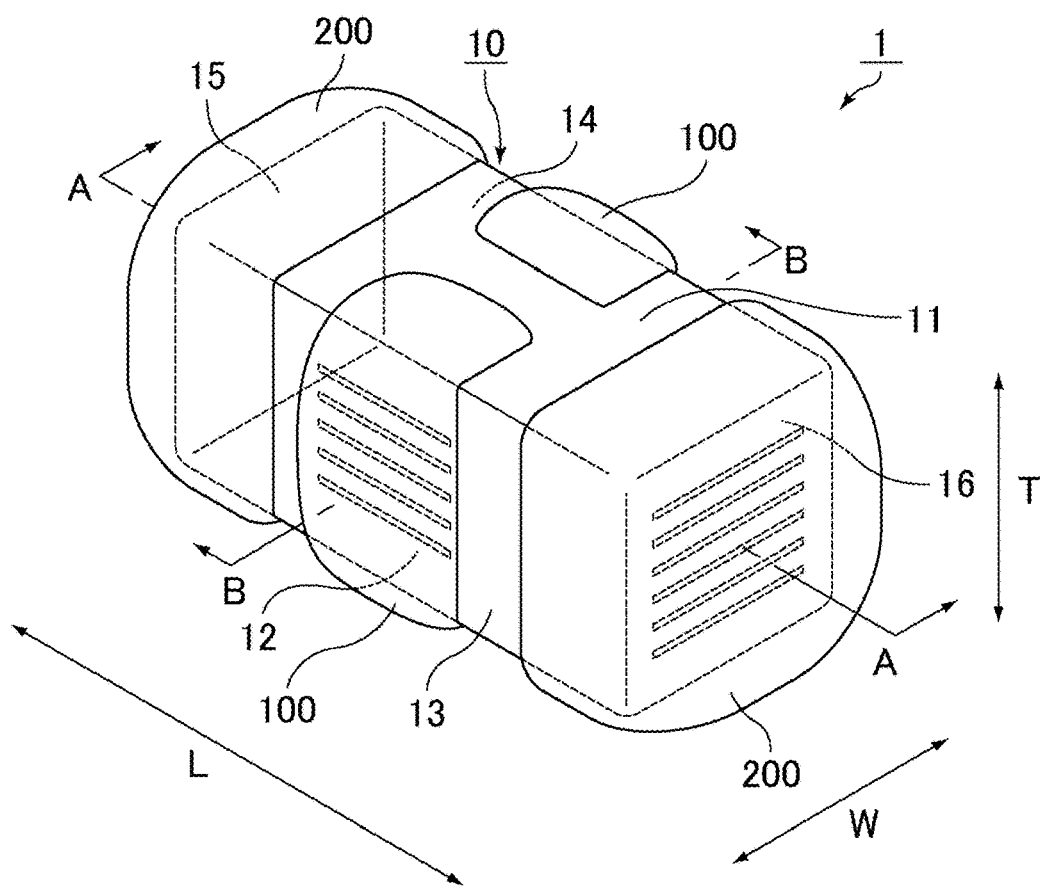
FIG. 2 is a schematic perspective view showing an example of a multilayer ceramic capacitor according to the first preferred embodiment of the present invention.

First, with reference to FIG. 1 and FIG. 2, a ceramic body and external electrodes defining a multilayer ceramic capacitor are described.

FIG. 1 is a schematic perspective view showing an example of a ceramic body defining a multilayer ceramic capacitor according to the first preferred embodiment of the present invention. FIG. 2 is a schematic perspective view showing an example of a multilayer ceramic capacitor according to the first preferred embodiment of the present invention.

In the multilayer ceramic capacitor and the ceramic body, a length direction, a width direction, and a lamination direction are directions specified by double-headed arrows L, W, and T, respectively, in a ceramic body 10 shown in FIG. 1 and a multilayer ceramic capacitor 1 shown in FIG. 2. The length direction, the width direction, and the lamination direction are perpendicular or substantially perpendicular to each other. The lamination direction is a direction in which multiple ceramic dielectric layers 20 and multiple internal electrode layers 30 defining the ceramic body 10 are stacked.

In the ceramic body 10 shown in FIG. 1 and the multilayer ceramic capacitor 1 shown in FIG. 2, the dimension in the length direction is greater than the dimension in the width direction. However, in the multilayer ceramic capacitor and the ceramic body according to preferred embodiments of the present invention, the size relationship between the dimension in the length direction and the dimension in the width direction is not limited, and the dimension in the length direction may be greater or smaller than the dimension in the width direction.

The ceramic body 10 has a cuboid shape including six surfaces, and includes the ceramic dielectric layers 20 and the internal electrode layers 30 that are laminated together. The ceramic body 10 includes a first main surface 11 and a second main surface 12 that oppose each other in the lamination direction T indicated by the double-headed arrow T in FIG. 1, a first lateral surface 13 and a second lateral surface 14 that oppose each other in the width direction W indicated by the double-headed arrow W perpendicular or substantially perpendicular to the lamination direction T, and a first end surface 15 and a second end surface 16 that oppose each other in the length direction L indicated by the double-headed arrow L perpendicular or substantially perpendicular to the lamination direction T and the width direction W.

Herein, a cross section of the ceramic body 10 perpendicular or substantially perpendicular to the first end surface 15 and the second end surface 16 and parallel or substantially parallel to the lamination direction of the ceramic body 10 is referred to as an "LT cross section". A cross section of the ceramic body 10 perpendicular or substantially perpendicular to the first lateral surface 13 and the second lateral surface 14 and parallel or substantially parallel to the lamination direction of the ceramic body 10 is referred to as a "WT cross section".

A cross section of the ceramic body 10 perpendicular or substantially perpendicular to the first lateral surface 13, the second lateral surface 14, the first end surface 15, and the second end surface 16 and also perpendicular or substantially perpendicular to the lamination direction of the ceramic body 10 is referred to as an "LW cross section".

The ceramic dielectric layers 20 include peripheral layer portions 21 and a central layer portion 22. The peripheral layer portions 21 are ceramic dielectric layers located adjacent to the respective main surfaces of the ceramic body 10 and between the main surface and the internal electrode layer closest to the main surface. A region sandwiched between the peripheral layer portions 21 is the central layer portion 22.

The ceramic body 10 includes first regions and second regions. The first regions are where first electrode layers are provided, and the second regions are where second electrode layers are provided.

The first electrode layers and the second electrode layers contain metals of the same type, and the metals of the same type in the first electrode layers and the second electrode layers have different densities.

The ceramic body 10 includes the first lateral surface 13 and the second lateral surface 14 that oppose each other in the width direction and each defining the first region, and the first end surface 15 and the second end surface 16 that oppose each other in the length direction and each defining the second region. First external electrodes 100 each including the first electrode layer are provided on the first lateral surface 13 and the second lateral surface 14, and second external electrodes 200 each including the second electrode layer are provided on the first end surface 15 and the second end surface 16 (see FIG. 2).

The first external electrodes 100 each include the first electrode layer, and the second external electrodes 200 each include the second electrode layer.

Subsequently, the ceramic dielectric layers, the internal electrode layers, and the external electrodes defining the multilayer ceramic capacitor are described with reference to FIG. 3 and FIG. 4.

Figure 3:
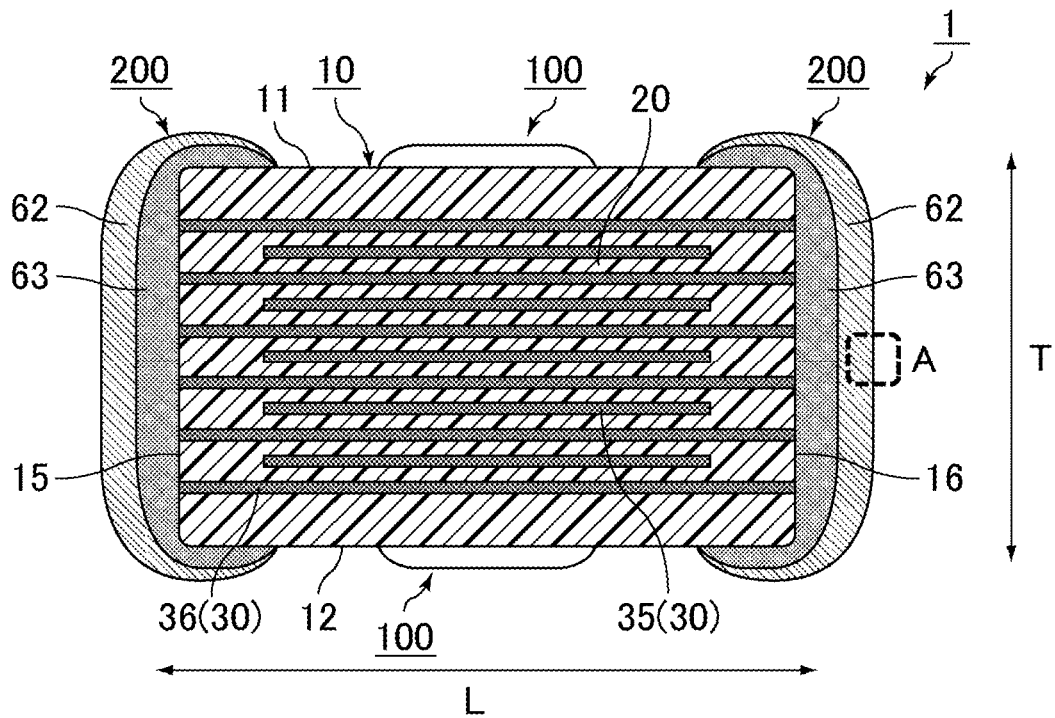
FIG. 3 is a schematic cross-sectional view showing an example of an LT cross section of the multilayer ceramic capacitor shown in FIG. 2.

FIG. 3 is a schematic cross-sectional view showing an example of an LT cross section of the multilayer ceramic capacitor shown in FIG. 2. FIG. 3 is also a cross-sectional view taken along line A-A of FIG. 2. FIG. 4 is a schematic cross-sectional view showing an example of a WT cross section of the multilayer ceramic capacitor shown in FIG. 2. FIG. 4 is also a cross-sectional view taken along line B-B of FIG. 2.

Figure 4:
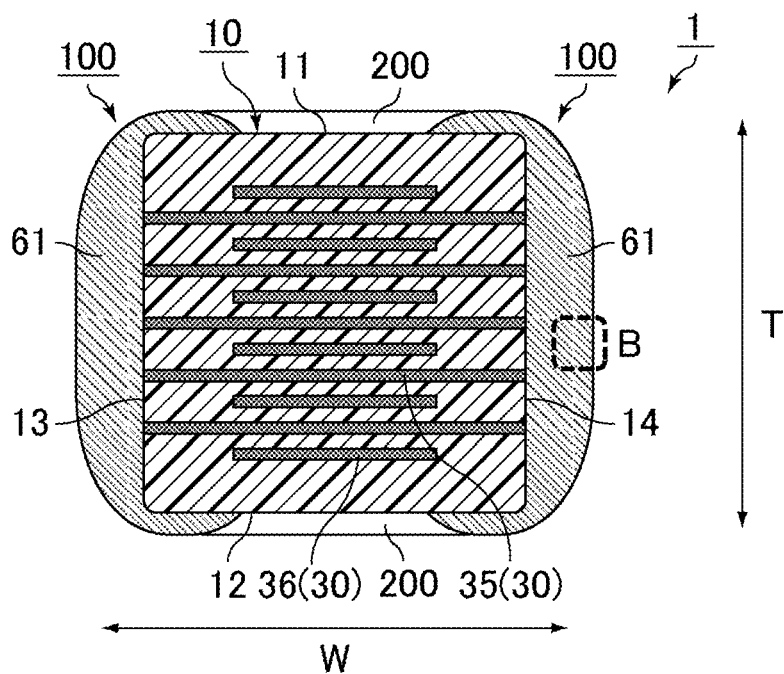
FIG. 4 is a schematic cross-sectional view showing an example of a WT cross section of the multilayer ceramic capacitor shown in FIG. 2.

As shown in FIG. 3 and FIG. 4, the multiple internal electrode layers 30 include first internal electrode layers 35 and second internal electrode layers 36 that are laminated together. The first internal electrode layers 35 are exposed at the first lateral surface 13 and the second lateral surface 14, and the second internal electrode layers 36 are exposed at the first end surface 15 and the second end surface 16. Capacitance is generated in an electrode opposing portion where one first internal electrode layer 35 and one second internal electrode layer 36 oppose each other with the ceramic dielectric layer 20 therebetween.

Specifically, the ceramic body 10 includes at least a pair of the first internal electrode layer 35 and the second internal electrode layer 36, and the ceramic dielectric layer 20 between the first internal electrode layer 35 and the second internal electrode layer 36, each defining a capacitor.

The first external electrodes 100 on the first lateral surface 13 and the second lateral surface 14 at which the first internal electrode layers 35 are exposed each include a first electrode layer 61.

The first electrode layer 61 is electrically connected to the first internal electrode layers 35.

Preferably, the second external electrodes 200 on the first end surface 15 and the second end surface 16 at which the second internal electrode layers 36 are exposed are external electrodes each including a resistance electrode layer.

FIG. 3 shows that the second external electrodes 200 each include a resistance electrode layer 63 and a second electrode layer 62.

The resistance electrode layer 63 has a higher electrical resistivity than the second electrode layer 62.

The second electrode layer 62 is electrically connected to the second internal electrode layers 36 via the resistance electrode layer 63.

The second external electrode is not limited to an external electrode including a resistance electrode layer, and may not include a resistance electrode layer. Specifically, the second external electrode may be defined by the second electrode layer.

The first electrode layer 61 and the second electrode layer 62 contain metals of the same type, and the metals of the same type in the first electrode layer 61 and the second electrode layer 62 have different densities.

Figure 5A:
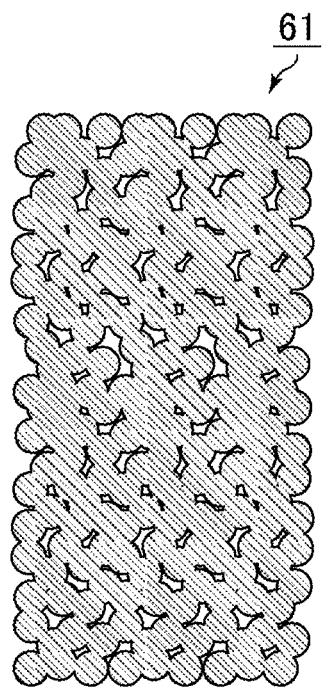
FIG. 5A is a schematic view showing a cross section of a first electrode layer.
Figure 5B:
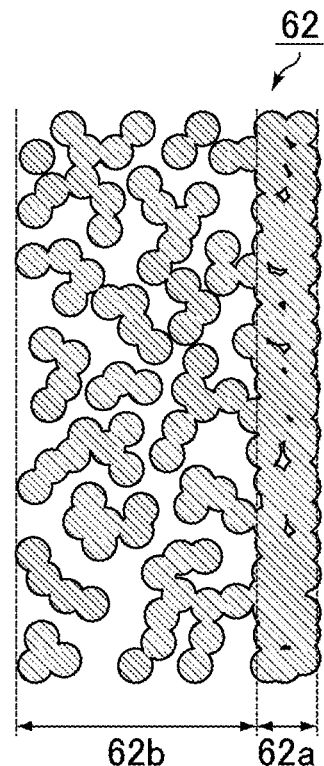
FIG. 5B is a schematic cross-sectional view showing a second electrode layer.

In this regard, a description is provided with reference to FIGS. 5A and 5B.

FIG. 5A is a schematic view showing a cross section of the first electrode layer. FIG. 5B is a schematic cross-sectional view showing a second electrode layer.

The cross section shown in FIG. 5A is a cross-sectional view showing a region surrounded by dotted lines B in FIG. 4. The cross section shown in FIG. 5B is a cross-sectional view showing a region surrounded by dotted lines A in FIG. 3.

FIGS. 5A and 5B show metal particles contained in the first electrode layer 61 and the second electrode layer 62.

As shown in FIG. 5A, the metal particles in the first electrode layer 61 are sintered and dense.

In contrast, while the metal particles are dense in a surface layer portion 62a of the second electrode layer 62, the metal particles are less dense in an inner portion 62b thereof.

Thus, the density of the metal in the first electrode layer as a whole is higher than the density of the metal in the second electrode layer as a whole. In addition, the density of the metal in the surface layer portion of the second electrode layer is higher than the density of the metal in the inner portion of the second electrode layer.

The surface layer portion and the inner portion of the second electrode layer are distinguished, for example, as follows: a region accounting for about 20% of the surface layer of the second electrode layer in the thickness direction is regarded as the surface layer portion; and the remainder of the about 80% is regarded as the inner portion.

The densities of the first electrode layer and the second electrode layer can be measured as follows.

The density can be determined by imaging cross sections of the first electrode layer or the second electrode layer by an optical microscope, and calculating the percentage of the metal particles in a visual field of about 10 μm×about 10 μm taken as 100% with 80/255-gray scale by binarizing these cross-sectional images.

For the second electrode layer, the densities of the surface layer portion and the inner portion are measured as determined above.

Preferably, the densities of the first electrode layer and the second electrode layer as determined above are in the following ranges.

Density of the first electrode layer: about 80% or more and about 93% or less

Density of the surface layer portion of the second electrode layer: about 80% or more and about 90% or less Density of the inner portion of the second electrode layer: about 75% or more and about 80% or less Difference in density between the surface layer portion and the inner portion of the second electrode layer: about 2% or more and about 5% or less The first electrode layer has a higher density as a whole. The second electrode layer has a higher density in its surface layer portion. The first electrode layer and the second electrode layer each have a high-density surface. This prevents a decrease in moisture resistance and infiltration of a plating solution.

The first electrode layer is provided in each first region, and the second electrode layer is provided in each second region. Thus, the ceramic electronic components according to preferred embodiments of the present invention are each considered to include external electrodes having sufficient density in multiple regions.

Preferably, the first electrode layer and the second electrode layer each contain, for example, at least one metal selected from the group consisting of Cu, Ni, Ag, Pd, Ag—Pd alloy, and Au. More preferably, these layers each contain Cu, for example. In addition, the first electrode layer and the second electrode layer each have a lower electrical resistivity than the resistance electrode layer.

The thicknesses of the first electrode layer and the second electrode layer are not limited, and are preferably about 5 μm or more and about 50 μm or less, for example.

The thicknesses of the first electrode layer and the second electrode layer are each an average of 30 points from six samples. In each sample, a region where the internal electrode layers are exposed is divided into four equal or substantially equal portions in the T direction, and the thickness of the first electrode layer or the second electrode layer is measured at five points obtained by such division.

The surface layer portion of the second electrode layer is, for example, a region accounting for about 20% of the surface layer of the second electrode layer in the thickness direction. Yet, the electrode layer having a higher density may extend further inward than the region accounting for about 20% of the surface layer of the second electrode layer. When the second electrode layer is thick and the electrode layer having a higher density is sufficiently thick in the surface layer portion, the electrode layer having a higher density may not be present in the entire region of the surface layer portion, and an electrode layer having a lower density may be present in a region closer to the inner portion in the surface layer portion.

In this case, the thickness of the electrode layer having a higher density in the second electrode layer is preferably about 3 μm or more and about 10 μm or less, for example.

In addition, the thickness of the electrode layer having a higher density in the second electrode layer is preferably about 5% or more and not more than about 30% the thickness of the second electrode layer, for example.

Preferably, the thickness of the electrode layer having a higher density in the second electrode layer is about 3 μm or more, for example, in order to prevent a decrease in moisture resistance and infiltration of a plating solution.

In addition, plating layers may be further provided on the first electrode layer of the first external electrode and on the second electrode layer of the second external electrode. The plating layers improves solder wettability, so as to facilitate mounting of a ceramic electronic component. The plating layers may have any composition, but Ni/Sn plating, for example, is preferable.

Preferred configurations of the ceramic body, the ceramic dielectric layers, the internal electrode layers, and the resistance electrode layers defining the external electrodes are described below.

Preferably, corners and edges of the ceramic body 10 are rounded. The corner is a portion where three surfaces of the ceramic body meet, and the edge is a portion where two surfaces of the ceramic body meet.

The length of the ceramic body 10 in the L direction is preferably about 0.4 mm or more and about 5.7 mm or less, more preferably about 0.46 mm or more and about 4.6 mm or less, and still more preferably about 0.46 mm or more and about 3.2 mm or less, for example. The length of the ceramic body 10 in the W direction is preferably about 0.2 mm or more and about 5.0 mm or less, more preferably about 0.28 mm or more and about 2.75 mm or less, and still more preferably about 0.28 mm or more and about 2.5 mm or less, for example. The length of the ceramic body 10 in the T direction is preferably about 0.19 mm or more and about 2.7 mm or less, more preferably about 0.2 mm or more and about 2.5 mm or less, and still more preferably about 0.2 mm or more and about 1.95 mm or less, for example.

The number of ceramic dielectric layers is preferably about 50 or more and about 600 or less, and more preferably about 100 or more and about 600 or less, for example. The number of ceramic dielectric layers does not include the number of ceramic dielectric layers defining the peripheral layer portions.

The thickness of each of the ceramic dielectric layers defining the central layer portion among the ceramic dielectric layers is preferably about 0.4 μm or more and about 3.0 μm or less, for example. The thickness of each peripheral layer portion is preferably about 20 μm or more and about 80 μm or less, and more preferably about 30 μm or more and about 80 μm or less, for example.

Each dimension of the ceramic body as described above can be measured by a micrometer, and the number of ceramic dielectric layers can be counted with an optical microscope.

Preferably, each ceramic dielectric layer may contain a perovskite compound, such as, for example, barium titanate ($BaTiO_3$), represented by a general formula $AmBO_3$ wherein A site is Ba and may contain, in addition to Ba, at least one selected from the group consisting of Sr and Ca; B site is Ti and may contain, in addition to Ti, at least one selected from the group consisting of Zr and Hf; O is oxygen; and m is a mole ratio of the A site to the B site. Alternatively, each ceramic dielectric layer may contain, for example, a ceramic material containing, as a main material, calcium titanate ($CaTiO_3$), strontium titanate ($SrTiO_3$), calcium zirconate ($CaZrO_3$), or the like. Each ceramic dielectric layer may also contain Mn, Mg, Si, Co, Ni, V, Al, a rare earth element, or the like as a sub-component whose content is smaller than that of the main component.

Preferably, each internal electrode layer contains a metal material such as, for example, Ni, Cu, Ag, Pd, Ag—Pd alloy, or Au. It is also preferable that each internal electrode layer contains, for example, a dielectric material having a composition of the same system as that of a ceramic material contained in the ceramic dielectric layers.

The number of internal electrode layers is preferably about 50 or more and about 600 or less, and more preferably about 100 or more and about 600 or less, for example. The average thickness of the internal electrode layers is preferably about 0.3 μm or more and about 1.0 μm or less, for example.

The resistance electrode layers contain a resistance component, and also contain, for example, glass, a metal, and a metal oxide, as needed.

The resistance component refers to any component having a relatively high electrical resistivity excluding metal and glass contained in common external electrodes. Specifically, the resistance component is preferably, for example, a metal oxide, carbon, or the like excluding glass.

The metal oxide that can be used as the resistance component is hereinafter also referred to as a "first metal oxide", and examples thereof include composite oxides such as In—Sn composite oxide (ITO), La—Cu composite oxide, Sr—Fe composite oxide, and Ca—Sr—Ru composite oxide.

Examples of the carbon that can be used include amorphous carbon such as carbon black and graphite.

Examples of the glass that can be used include B—Si glass, B—Si—Zn glass, B—Si—Zn—Ba glass, and B—Si—Zn—Ba—Ca—Al glass.

Preferably, the first metal oxide and the glass are present at a volume ratio of about 30:70 to about 70:30, for example, in each resistance electrode layer.

Preferably, the metal includes, for example, at least one selected from the group consisting of Ag, Ni, Cu, Au, and Pd. Ni is more preferable among these because Ni can provide a smaller particle size.

A metal oxide other than the first metal oxide is hereinafter also referred to as a "second metal oxide", and examples thereof include $Al_2O_3$, $ZrO_2$, $TiO_2$, and ZnO.

The electrical resistivity and density of each resistance electrode layer can be adjusted by adjusting the types and percentages of the resistance component, glass, metal, and second metal oxide.

For example, adding a metal decreases the electrical resistivity of the resistance electrode layers, while adding of the second metal oxide increases the electrical resistivity of the resistance electrode layers.

Further, adding a metal such as, for example, Ni or Cu, $Al_2O_3$, or $TiO_2$ can promote densification of the resistance electrode layers. Meanwhile, adding a metal such as, for example, Mo, Cr, or Nb or adding the second metal oxide such as, for example, $ZrO_2$ or ZnO can reduce densification of the resistance electrode layers.

The reduction of densification implies prevention of blisters that occur due to over-sintering of the resistance electrode layers.

The thickness of each resistance electrode layer is not limited, but it is preferably about 5 μm or more and about 25 μm or less, for example. The thickness of each resistance electrode layer is an average of 30 points from six samples. In each sample, a region where the internal electrode layers are exposed is divided into four equal parts in the T direction, and the thickness of the resistance electrode layer is measured at five points obtained by such division.

The electrical resistivity of each resistance electrode layer is preferably about 0.01 Ω·cm or more and about 100 Ω·cm or less, more preferably about 0.05 Ω·cm or more and about 10 Ω·cm or less, still more preferably about 0.05 Ω·cm or more and about 1 Ω·cm or less, for example.

Second Preferred Embodiment of Ceramic Electronic Component

Subsequently, a ceramic electronic component according to a second preferred embodiment of the present invention is described.

In the ceramic electronic component according to the second preferred embodiment, each external electrode includes a thin electrode layer. Other features are the same or substantially the same as those of the ceramic electronic component of the first preferred embodiment, and the descriptions thereof are thus omitted.

Figure 6:
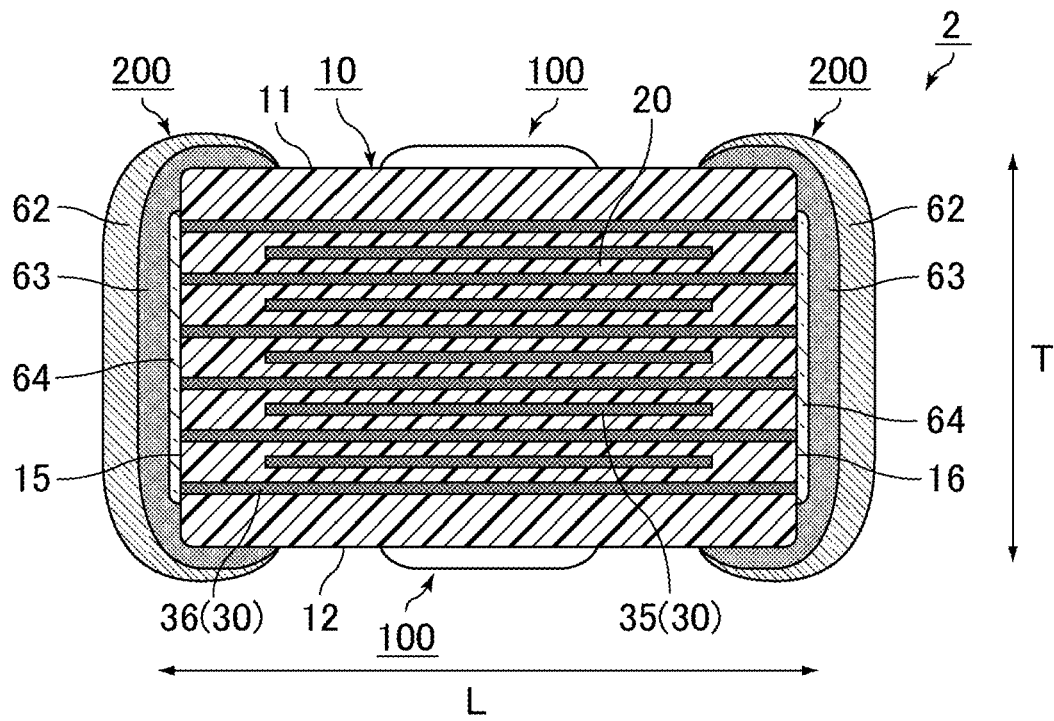
FIG. 6 is a schematic cross-sectional view showing an example of an LT cross section of a multilayer ceramic capacitor as a ceramic electronic component according to a second preferred embodiment of the present invention.

FIG. 6 is a schematic cross-sectional view showing an example of an LT cross section of a multilayer ceramic capacitor as a ceramic electronic component according to the second preferred embodiment of the present invention.

FIG. 6 shows a multilayer ceramic capacitor 2. The multilayer ceramic capacitor 2 has the same or substantially the same configuration as that of the multilayer ceramic capacitor 1 shown in FIG. 3, except that the second external electrodes 200 each include a thin electrode layer 64.

The thin electrode layer 64 is in direct contact with the second internal electrode layer 36, and the resistance electrode layer 63 is provided on the thin electrode layer 64. The second electrode layer 62 is provided on the resistance electrode layer 63.

Specifically, each second external electrode 200 includes the thin electrode layer 64, the resistance electrode layer 63, and the second electrode layer 62.

The thin electrode layers are in direct contact with multiple second internal electrode layers. Thus, from the viewpoint of equivalent circuit of the multilayer ceramic capacitor, wires of multiple capacitor elements, which are collected by the thin electrode layers, can be regarded as being connected to the resistance electrode layers. In contrast, when the second internal electrode layers are in direct contact with the resistance electrode layers, circuits each in which capacitor elements and resistance elements are connected in series can be regarded as being connected in parallel. Thus, presumably, the connection is more stable when the multilayer ceramic capacitor includes the thin electrode layers than when the second internal electrode layers are in direct contact with the resistance electrode layers.

The electrical resistivity of each thin electrode layer is preferably about $1.65 \times 10^{-6}$ Ω·cm or more and about $1.65 \times 10^{-4}$ Ω·cm or less, for example. In addition, preferably, the thin electrode layers have a lower electrical resistivity than the resistance electrode layers.

Preferably, the thin electrode layers are plating electrodes formed by plating, in view of electrical resistivity, adhesiveness, and manufacturability of the thin electrode layers.

A thin electrode layer formed by plating is also referred to as a "plating electrode". A thin electrode layer formed by sputtering is also referred to as a "sputtering electrode". A thin electrode layer formed by vapor deposition is also referred to as a "vapor deposition electrode".

Each thin electrode layer may be a laminate including multiple layers including at least one of the plating electrode, the sputtering electrode, or the vapor deposition electrode.

Preferably, a metal used for the thin electrode layers includes, for example, at least one selected from the group consisting of Cu, Ni, Ag, Pd, Ag—Pd alloy, and Au. More preferably, it includes Cu, for example. Preferably, the thin electrode layers do not contain glass. Preferably, the metal content per unit volume is about 99 vol % or higher, for example.

The thickness of each thin electrode layer is not limited, but it is preferably about 0.5 μm or more and about 9 μm or less, more preferably about 1 μm or more and about 5 μm or less, and still more preferably about 2 μm or more and about 3 μm or less, for example.

The thickness of each thin electrode layer can be measured by cutting the multilayer ceramic capacitor to expose an LT cross section and observing the LT cross section with a microscope. One thin electrode layer on a region where the second internal electrode layers are exposed is divided into four equal or substantially equal portions in the T direction to obtain five points (i.e., three points corresponding to boundaries between the divided parts of the thin electrode layer and two points corresponding to end portions of the thin electrode layer in the T direction), and the thickness of the thin electrode layer is calculated at these five points in six samples to determine an average of 30 points as the thickness of the thin electrode layer.

Preferred Embodiments of Ceramic Electronic Component Other Than Multilayer Ceramic Capacitor The ceramic electronic components according to preferred embodiments of the present invention have been described taking a case where the ceramic electronic component is a multilayer ceramic capacitor as an example. Yet, the ceramic electronic component of the present invention is not limited to the multilayer ceramic capacitor.

In the case of the ceramic electronic component other than a multilayer ceramic capacitor, ceramics of the ceramic dielectric layers may be piezoelectric ceramics such as, for example, PZT ceramics, semiconductor ceramics such as, for example, spinel ceramics, or magnetic ceramics such as, for example, ferrite.

Use of piezoelectric ceramics provides a ceramic electronic component that defines and functions as a piezoelectric component, and use of semiconductor ceramics provides a ceramic electronic component that defines and functions as a thermistor.

Method of Producing Ceramic Electronic Component

Subsequently, a method of producing a ceramic electronic component according to a preferred embodiment of the present invention is described.

The method of producing a ceramic electronic component is described below taking a case of producing a multilayer ceramic capacitor as the ceramic electronic component of the first preferred embodiment described above as an example.

FIG. 7 is a flowchart of an example of a production process of a ceramic electronic component according to the preferred embodiment of the present invention.

First, a ceramic body is produced (steps S1, S2, S3, and S4).

Specifically, a ceramic body having a cuboid shape is produced which includes a laminate of multiple ceramic dielectric layers and multiple internal electrode layers and which includes first regions and second regions where the multiple internal electrode layers are exposed.

Such a ceramic body is formed by, for example, a method that includes providing a ceramic green sheet that turns into a ceramic dielectric layer on which an internal electrode pattern that turns into an internal electrode layer is formed, stacking and compressing a predetermined number of such ceramic green sheets to provide a green sheet laminate, and firing the green sheet laminate.

In step S1, ceramic green sheets are produced.

Each ceramic green sheet can be formed as follows, for example: a ceramic slurry that is a mixture of a metal oxide as a raw material of the ceramic dielectric layers, an organic substance, a solvent, and the like is applied in a sheet form to a carrier film such as a PET film by a method such as spray coating, die coating, or screen printing, for example.

The thickness of each ceramic green sheet is preferably about 0.4 µm or more and about 3.0 µm or less, for example.

Suitable examples of the metal oxide as a raw material of the ceramic dielectric layers include the same raw materials of the ceramic dielectric layers of the multilayer ceramic capacitor.

In step S2, internal electrode layers are formed.

A conductive paste that turns into the internal electrode layers contains, for example, a metal material such as Ni powder, a solvent, a dispersant, and a binder. The conductive paste is printed on each ceramic green sheet by a method such as screen printing or gravure printing, for example, such that an internal electrode pattern can be produced.

The thickness of the printed internal electrode pattern is preferably about 0.3 µm or more and about 1.0 µm or less, for example.

In step S3, the ceramic green sheets with the internal electrode layers produced are stacked, compressed, and cut into pieces.

Examples of the compression method include rigid pressing and hydrostatic pressing.

At the time of pressing, a resin sheet having a certain thickness may be provided on an outermost layer, so that sufficient pressure can be also applied to a portion where the internal electrode pattern is not formed, thus increasing the adhesive force between the ceramic green sheets.

The resulting green sheet laminate is cut into pieces such that the internal electrode layers are exposed at two or more portions, as needed.

In step S4, the pieces of the green sheet laminate are fired under predetermined conditions.

Thus, ceramic bodies are obtained.

Subsequently, first electrode layers are formed (steps S5 and S6).

In step S5, a first electrode paste containing a metal powder is applied to a first lateral surface and a second lateral surface (i.e., first regions) of a ceramic body.

Examples of the application method include one that includes applying the first electrode paste containing a metal powder dispersed in a solvent to the first regions of the ceramic body and one that includes attaching a first electrode paste sheet made from the first electrode paste to the first regions of the ceramic body.

The thickness of the first electrode paste is not limited, but the thickness of each first electrode layer after firing is preferably about 5 µm or more and about 50 µm or less, for example.

Preferably, the first electrode paste contains, for example, a metal powder, glass, a dispersant, a solvent, and the like, and has a certain viscosity.

Preferably, the metal powder has a smaller average particle size, and one having an average particle size of, for example, about 0.1 µm or more and about 3 µm or less is more preferred.

Suitable examples of the metal powder of the first electrode paste include the same materials of the first electrode layers described for the ceramic electronic component of the present invention. Preferably, the metal powder is Cu powder, for example.

In step S6, the first electrode paste applied to the first regions of the ceramic body is baked at a first temperature. Thus, the first electrode layers are formed.

Preferably, the first temperature is a temperature at which sintering of the metal powder in the first electrode paste proceeds sufficiently. The first temperature is preferably about 800° C. or higher and about 940° C. or lower, for example.

Setting the first temperature to about 840° C. or higher allows sintering of the metal powder in the first electrode paste to proceed sufficiently. Thus, the first electrode layers having a higher density can be formed.

The first electrode layers formed as described above define first external electrodes.

Subsequently, resistance electrode layers are formed (steps S7 and S8).

Forming the resistance electrode layers is optional in the method of producing a ceramic electronic component of the present invention.

In step S7, a resistance electrode paste is applied to a first end surface and a second end surface (i.e., the second regions) of the ceramic body.

Examples of the application method include one that includes immersing the second regions of the ceramic body in the resistance electrode paste that turns into the resistance electrode layers, one that includes attaching a sheet made from the resistance electrode paste to the second regions of the ceramic body, and one that includes applying the resistance electrode paste by a dispenser.

The thickness of the resistance electrode paste is not limited, but the thickness of each resistance electrode layer after firing is preferably about 5 µm or more and about 25 µm or less, for example.

Preferably, the resistance electrode paste contains, for example, a metal oxide powder, glass, a dispersant, a solvent, and the like, and has a certain viscosity.

The resistance electrode paste is formed into a sheet by, for example, a method that includes applying the resistance electrode paste to a carrier film, drying the paste, and removing the carrier film.

Suitable examples of the metal oxide and glass of the resistance electrode paste include the same materials of the resistance electrode layer described for the ceramic electronic components according to preferred embodiments of the present invention.

In step S8, the resistance electrode paste applied to the second regions of the ceramic body is baked.

Thus, the resistance electrode layers are formed.

Preferably, the baking temperature of the resistance electrode paste is a temperature between the first temperature and a second temperature (described later) that is lower than the first temperature. The baking temperature is preferably about 720° C. or higher and about 800° C. or lower, for example.

The baking temperature of the resistance electrode paste being lower than the first temperature is preferred because the first electrode layers formed first are prevented from being damaged.

Subsequently, second electrode layers are formed (steps S9 and S10).

When the resistance electrode layers are formed in the second regions of the ceramic body, the second electrode layers are formed on surfaces of the resistance electrode layers. When no resistance electrode layers are formed in the second regions of the ceramic body, the second electrode layers may be directly formed in the second regions of the ceramic body. The following description is provided on the assumption that the resistance electrode layers are provided.

In step S9, a second electrode paste containing a metal powder is applied to the first end surface and the second end surface (i.e., the second regions) of the ceramic body with the resistance electrode layers formed.

Examples of the application method include one that includes applying the second electrode paste containing a metal powder dispersed in a solvent to the resistance electrode layers in the second regions of the ceramic body, one that includes immersing in the second electrode paste the end surfaces of the ceramic body with the resistance electrode layers formed, and one that includes attaching a second electrode paste sheet made from the second electrode paste to the resistance electrode layers in the second regions of the ceramic body.

The thickness of the second electrode paste is not limited, but the thickness of each second electrode layer after firing is preferably about 5 μm or more and about 50 μm or less, for example.

The second electrode paste may have any composition as long as it makes the electrical resistivity of the second electrode layers lower than that of the resistance electrode layers. Preferably, the second electrode paste contains, for example, a metal powder, glass, a dispersant, a solvent, and the like, and has a certain viscosity.

Preferably, the metal powder has a smaller average particle size, and one having an average particle size of, for example, about 0.1 μm or more and about 3 μm or less is more preferred.

The second electrode paste contains a metal powder of the same type as the metal powder in the first electrode paste.

Preferably, the metal powder in the first electrode paste and the metal powder in the second electrode paste are Cu powder, for example.

In step S10, the second electrode paste applied to the second regions of the ceramic body is baked at a second temperature. Thus, the second electrode layers are formed.

The second temperature is lower than the first temperature.

The second temperature being lower than the first temperature prevents damage to the first electrode layers formed first.

The second temperature is preferably about 650° C. or higher and about 750° C. or lower, for example.

The second electrode layers formed by baking at the second temperature lower than the first temperature at which sintering of the metal powder proceeds sufficiently have a lower density due to insufficient sintering of the metal powder.

Subsequently, a physical shock treatment is applied to a surface of each second electrode layer to densify a surface layer portion of the second electrode layer (step S11).

Examples of the physical shock treatment include blasting and barreling. Examples of the blasting include sandblasting, shot blasting, and wet blasting.

When the physical shock treatment is sandblasting, the discharge pressure is preferably about 0.03 MPa or more and about 0.1 MPa or less, for example. Preferably, abrasive grains have an average grain size of about 60 μm or more and about 80 μm or less, for example.

While the second electrode layers formed by baking at the second temperature have a lower density, the surface layer portion of each second electrode layer is densified by physical pressure applied to the surface layer of the second electrode layer in the physical shock treatment.

As a result, the density of the metal in a surface layer portion of the second electrode layer is higher than the density of the metal in the inner portion of the second electrode layer.

The second electrode layers formed as described above turn into portions of the respective second external electrodes.

In the method of producing a ceramic electronic component according to the present preferred embodiment, the second electrode paste is baked at a lower temperature so that the first electrode layers formed first are prevented from being damaged. In addition, a physical shock treatment is applied to the second electrode layers having a lower density obtained by baking at a lower temperature to densify the surface layer portions of the second electrode layers, such that the second electrode layers having sufficient density are formed.

The external electrodes having sufficient density can be formed at multiple regions by forming the second electrode layers by a combination of such baking at a lower temperature and a physical shock treatment.

The first electrode layers and the second electrode layers may be plated (step S12).

The formation of the plating layers by plating improves solder wettability, facilitating mounting of a ceramic electronic component. The plating layers may have any composition, but Ni/Sn plating, for example, is preferred.

Examples that more specifically disclose the ceramic electronic components and the methods of producing a ceramic electronic component according to preferred embodiments of the present invention are described below. The present invention is not limited to these examples.

Example 1

Production of Ceramic Body

A polyvinyl butyral binder, a plasticizer, and ethanol as an organic solvent were added to $BaTiO_3$ as a ceramic material, and these components were wet-mixed in a ball mill to produce a ceramic slurry. The ceramic slurry was formed into a sheet by a lip method to obtain a ceramic green sheet in a rectangular shape. A conductive paste containing Ni was screen-printed on the ceramic green sheet to form an internal electrode pattern containing Ni as a main component. Multiple ceramic green sheets each having the internal electrode pattern were stacked such that the sides to which the internal electrode layers were led out alternated with each other, such that a raw laminate sheet to define a capacitor body was obtained. The raw laminate sheet was pressure-molded and divided by dicing to obtain chips. The resulting chips were heated at about 1200° C. in a $N_2$ atmosphere to burn the binder. Subsequently, the chips were fired in a reducing atmosphere containing $H_2$, $N_2$, and $H_2O$ gases, such that sintered ceramic bodies were obtained. Each ceramic body has a structure including multiple ceramic dielectric layers and multiple internal electrode layers. The dimensions of the ceramic body were as follows: about 0.92 mm in an L direction×about 0.55 mm in a W direction×about 0.39 mm in a T direction.

First internal electrode layers were exposed at a first lateral surface and a second lateral surface defining end surfaces in the W direction. Second internal electrode layers were exposed at a first end surface and a second end surface defining end surfaces in the L direction.

The internal electrode layers had an average thickness of about 0.55 μm, the ceramic dielectric layers between the internal electrode layers had an average thickness of about 0.75 μm, and there were 266 internal electrode layers.

Formation of First Electrode Layers

A conductive paste (first electrode paste) containing copper powder was applied to surfaces of the first internal electrode layers exposed at the first lateral surface and the second lateral surface, and the conductive paste was baked at about 850° C., such that first electrode layers were formed on the first lateral surface and the second lateral surface of the ceramic body.

Formation of Resistance Electrode Layers

A powder mixture containing a mixture of an In—Sn composite oxide, glass, and Ni powder at a ratio of about 40 wt %:50 wt %:10 wt % was dispersed in a solvent to produce a resistance electrode paste. The glass was B—Si—Zn—Ba—Ca—Al glass.

The resistance electrode paste obtained above was applied by a dispenser to surfaces of the second internal electrode layers exposed at the first end surface and the second end surface, and the resistance electrode paste was baked at about 780° C., such that resistance electrode layers were formed on the first end surface and the second end surface of the ceramic body.

Formation of Second Electrode Layers

A mixture of copper powder (a mixture of spherical particles and flat particles) having an average particle size of about 1 μm and glass was dispersed in a solvent to produce a second electrode paste.

The glass was B—Si—Zn—Ba—Ca—Al glass, as is the case with the resistance electrode paste.

The first end surface and the second end surface of the ceramic body were immersed in the second electrode paste obtained above to apply the second electrode paste to the resistance electrode layers, and subsequently, the second electrode paste was baked at about 680° C., whereby second electrode layers were formed at the first end surface and the second end surface of the ceramic body.

The thickness of each resistance electrode layer was about 20 μm or more and about 30 μm or less. The thickness of each second electrode layer was about 20 μm or more and about 30 μm or less.

Physical Shock Treatment

The ceramic body with the first electrode layer and the second electrode layer formed was sandblasted. Sandblasting was performed at a discharge pressure of about 0.05 MPa with abrasive grains having an average particle size of about 70 μm.

A surface layer portion of each second electrode layer having a lower density was densified by sandblasting.

Plating

Ni plating and subsequent Sn plating were performed on the first electrode layers and the second electrode layers to form Ni/Sn plating layers on the first electrode layers and the second electrode layers.

A multilayer ceramic capacitor as a ceramic electronic component was produced by the above steps.

Examples 2 and 3

In Example 2, the sandblasting time was about ¼ that in Example 1. In Example 3, the sandblasting time was about ½ that in Example 1. Other than that, the same or substantially the same process as in Example 1 was repeated to produce a multilayer ceramic capacitor as a ceramic electronic component.

Comparative Example 1

Sandblasting was not performed in Comparative Example 1. Other than that, the same or substantially the same process as in Example 1 was repeated to produce a multilayer ceramic capacitor as a ceramic electronic component.

Density Measurement

The multilayer ceramic capacitors of Examples 1 to 3 and Comparative Example 1 were subjected to density measurement. The density was determined by imaging cross sections of the surface layer portions of the second electrode layers, the inner portions of the second electrode layers, and the first electrode layers by an optical microscope (L-200 available from NIKON, 100× objective lens), and calculating the percentage of Cu particles in a visual field of about 10 μm×about 10 μm taken as 100% with 80/255-gray scale by binarizing these cross-sectional images.

An average density was calculated using 10 multilayer ceramic capacitor samples. Table 1 shows the results.

Moisture Resistance Load Test

The multilayer ceramic capacitors of Examples 1 to 3 and Comparative Example 1 were subjected to moisture resistance load tests at a temperature of about 125° C. and a humidity of about 95% RH with an applied voltage of about 2.0 V. Logarithmic values (Log IR) of insulation resistance of the multilayer ceramic capacitors were determined, and the number of samples in which Log IR decreased by two digits or more relative to initial values before about 72 hours elapsed was counted.

Table 1 shows the number of samples in which Log IR decreased by two digits or more out of 72 multilayer ceramic capacitor samples in the moisture resistance load tests.

Solder Explosion Test

The multilayer ceramic capacitors of Examples 1 to 3 and Comparative Example 1 were reflow-mounted on glass epoxy substrates (reflow furnace temperature: about 260° C.), and then sputtering of solder was visually checked.

Multilayer ceramic capacitors with a large amount of sputtering of solder were counted as solder explosion defects.

Table 1 shows the number of samples determined as solder explosion defects out of 1000 multilayer ceramic capacitor samples in the solder explosion tests.

TABLE 1

| | | Example 1 | Example 2 | Example 3 | Comparative Example 1 |
|---|---|---|---|---|---|
| Density of second electrode layer (%) | Inner portion | 85 | 74 | 78 | 70 |
| | Surface layer portion | 88 | 76 | 80 | 70 |
| Density of first electrode layer (%) | | 90 | 90 | 90 | 90 |

TABLE 1-continued

| | Example 1 | Example 2 | Example 3 | Comparative Example 1 |
|---|---|---|---|---|
| Moisture resistance load test (number of multilayer ceramic capacitors) | 0/72 | 2/72 | 0/72 | 12/72 |
| Solder explosion test (number of multilayer ceramic capacitors) | 0/1000 | 3/1000 | 0/1000 | 24/1000 |

In Examples 1 to 3, the second electrode layers were sandblasted. Thus, each second electrode layer has a higher density in its surface layer portion than in its inner portion, thus yielding excellent results in the moisture resistance load tests and the solder explosion tests.

In Comparative Example 1, the density of each second electrode layer is the same between the inner portion and the surface layer portion, and thus has a low moisture resistance. In addition, presumably, infiltration of a plating solution occurred in the second electrode layers because many samples were determined as defects in the solder explosion test.

In Examples 1 to 3, the baking temperature (about 680° C.) of the second electrode paste and the baking temperature (about 780° C.) of the resistance electrode paste are lower than the baking temperature (about 850° C.) of the first electrode paste. Thus, the first electrode layers formed first are prevented from being damaged by baking of the resistance electrode paste and baking of the second electrode paste.

Example 4

In Example 1, no resistance electrode layers were formed on the first end surface and the second end surface of the ceramic body. The second electrode layers were directly formed on the first end surface and the second end surface of the ceramic body.

Other than those, the same or substantially the same process as in Example 1 was repeated to produce a multilayer ceramic capacitor as a ceramic electronic component.

The thickness of each second electrode layer was about 40 μm.

Comparative Example 2

Comparative Example 2 was not subjected to sandblasting. Other than that, the same or substantially the same process as in Example 4 was repeated to produce a multilayer ceramic capacitor as a ceramic electronic component.

The multilayer ceramic capacitors of Example 4 and Comparative Example 2 were subjected to density measurement and moisture resistance load tests but not to solder explosion tests. Table 2 tabulates the results of the density measurement and the results of the moisture resistance load tests.

TABLE 2

| | | Example 4 | Comparative Example 2 |
|---|---|---|---|
| Density of second electrode layer (%) | Inner portion | 85 | 85 |
| | Surface layer portion | 88 | 85 |
| Density of first electrode layer (%) | | 90 | 90 |

TABLE 2-continued

| | Example 4 | Comparative Example 2 |
|---|---|---|
| Moisture resistance load test (number of multilayer ceramic capacitors) | 36/72 | 50/72 |
| Solder explosion test (number of multilayer ceramic capacitors) | — | — |

A comparison between Example 4 and Comparative Example 2 in both of which no resistance electrode layers were formed also shows that Example 4 in which the second electrode layers were sandblasted to increase the density of the surface layer portions has a better result in the moisture resistance load test. This shows that multilayer ceramic capacitors (ceramic electronic components) having a higher moisture resistance can be produced by making the density of the surface layer portion of each second electrode layer higher than the density of the inner portion of the second electrode layer, regardless of the presence or absence of the resistance electrode layers.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of producing a ceramic electronic component, comprising:
    baking a first electrode paste containing a metal powder at a first temperature to form a first electrode layer at a first region of a ceramic body;
    baking a second electrode paste containing a metal powder of a same type as the metal powder in the first electrode paste at a second temperature lower than the first temperature to form a second electrode layer at a second region different from the first region of the ceramic body; and
    applying a physical shock treatment to a surface of the second electrode layer to densify a surface layer portion of the second electrode layer; wherein
    the applying the physical shock treatment includes the physical shock treatment being applied to only the surface of the second electrode layer.

2. The method of producing a ceramic electronic component according to claim 1, wherein a resistance electrode paste is baked to form a resistance electrode layer at the second region of the ceramic body, and the second electrode layer is formed on a surface of the resistance electrode layer.

3. The method of producing a ceramic electronic component according to claim 2, wherein a baking temperature of the resistance electrode paste is between the first temperature and the second temperature.

4. The method of producing a ceramic electronic component according to claim 2, wherein the ceramic body includes end surfaces that oppose each other in a length direction and each defining the second region, and lateral surfaces that oppose each other in a width direction and each defining the first region, the first electrode layer is formed on each lateral surface, and the resistance electrode layer and the second electrode layer are formed on each end surface.

5. The method of producing a ceramic electronic component according to claim 1, wherein the ceramic body includes at least a pair of a first internal electrode layer and a second internal electrode layer, and a ceramic dielectric layer between the first internal electrode layer and the second internal electrode layer, each defining a capacitor.

6. The method of producing a ceramic electronic component according to claim 5, wherein the first electrode layer is electrically connected to the first internal electrode layer, and the second electrode layer is electrically connected to the second internal electrode layer.

7. The method of producing a ceramic electronic component according to claim 1, wherein the method further comprises plating surfaces of the first electrode layer and the second electrode layer after densification of the surface layer portion of the second electrode layer.

8. The method of producing a ceramic electronic component according to claim 1, wherein the physical shock treatment includes sandblasting.

9. A ceramic electronic component comprising:
a ceramic body;
a first electrode layer provided in a first region of the ceramic body; and
a second electrode layer provided in a second region different from the first region of the ceramic body; wherein the first electrode layer and the second electrode layer contain metals of a same type;
the metals of the same type in the first electrode layer and the second electrode layer have different densities;
the density of the metal in a surface layer portion of the second electrode layer is higher than the density of the metal in an inner portion of the second electrode layer; and
the density of the metal in the first electrode layer as a whole is higher than the density of the metal in the second electrode layer as a whole.

10. The ceramic electronic component according to claim 9, the first electrode layer is provided on a lateral surface of the ceramic body.

11. The ceramic electronic component according to claim 9, wherein the second electrode layer is provided on an end surface of the ceramic body.

12. The ceramic electronic component according to claim 9, further comprising:
a resistance electrode layer provided between the ceramic body and the second electrode layer; wherein
the resistance electrode layer has a higher electrical resistivity than the second electrode layer.

13. The ceramic electronic component according to claim 9, wherein the surface layer portion of the second electrode layer is defined by about 20% of the second electrode layer in a thickness direction, and the inner portion of the second electrode layer is defined by about 80% of the second electrode layer in the thickness direction.

14. The ceramic electronic component according to claim 9, wherein a difference in densities between the surface layer portion and the inner portion of the second electrode layer is about 2% or more and about 5% or less.

15. The ceramic electronic component according to claim 9, wherein a density of the first electrode layer is about 80% or more and about 93% or less.

16. The ceramic electronic component according to claim 9, wherein a density of the surface layer portion of the second electrode layer is about 80% or more and about 90% or less.

17. The ceramic electronic component according to claim 9, wherein a density of the inner portion of the second electrode layer is about 75% or more and about 80% or less.

18. The ceramic electronic component according to claim 9, wherein the first electrode layer and the second electrode layer each contain Cu.

19. The ceramic electronic component according to claim 9, wherein a thickness of each of the first and second electrode layers is about 5 μm or more and about 50 μm or less.

20. The ceramic electronic component according to claim 9, further comprising a thin electrode layer between the ceramic body and the second electrode layer.

* * * * *